July 30, 1968   M. GRANT   3,394,459
MEASURING DEVICE
Filed April 18, 1966   2 Sheets-Sheet 1
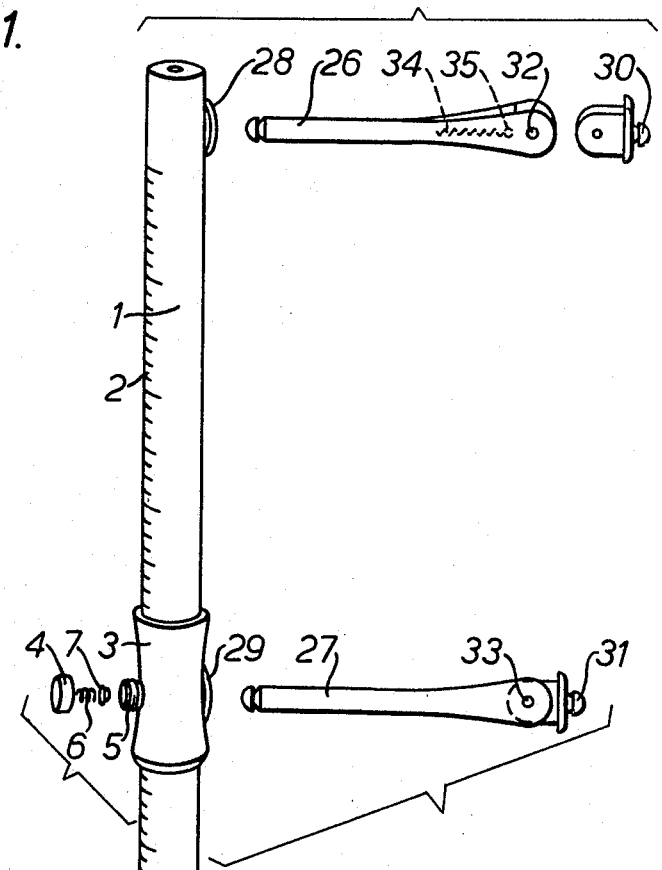
INVENTOR:- Monty Grant July 30, 1968   M. GRANT   3,394,459
MEASURING DEVICE
Filed April 18, 1966   2 Sheets-Sheet 2
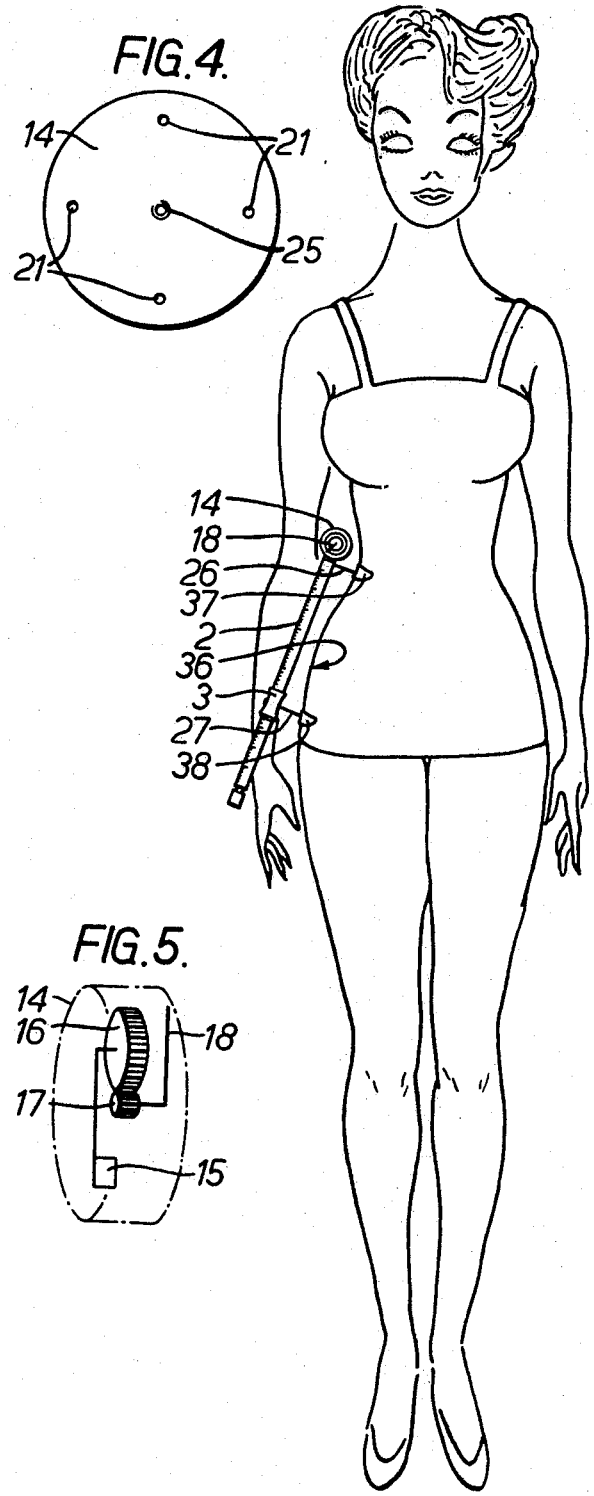
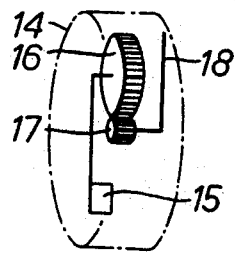
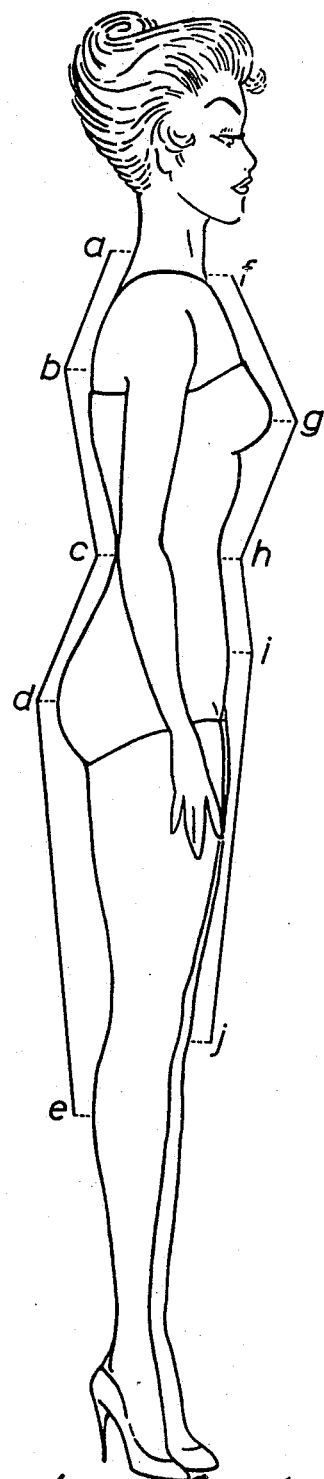
INVENTOR:- Monty Grant

United States Patent Office 3,394,459
Patented July 30, 1968

3,394,459
MEASURING DEVICE
Monty Grant, 2911 W. 141st Place, Apt. 3,
Gardena, Calif. 90249
Filed Apr. 18, 1966, Ser. No. 543,254
Claims priority, application Great Britain, Aug. 23, 1965,
36,033/65
5 Claims. (Cl. 33—7)

ABSTRACT OF THE DISCLOSURE

The invention provides a measuring device particularly for use in the clothing trade, the device comprising an elongated member marked with a scale and having a cursor slidable thereon, an angular indicator secured to one end of the said member for indicating the angle of said member to the vertical or horizontal and an extension piece secured to the other end of the said member, the extension piece having means for receiving the slidable cursor.

---

This invention relates to a measuring device and has for its primary object to provide a relatively simple but efficient device for measuring the distance in a straight line between two points and for measuring the angle by which said line deviates from the horizontal or vertical. The invention has particular but not exclusive application to the measurement of the human figure in connection with the fitting of clothing, the improved device in this instance making it possible to obtain inter alia a complete and accurate profile picture of a person to be fitted.

According to the invention in its broadest aspect there is provided a device for measuring the distance in a straight line between two points and for measuring the angle by which said line deviates from the horizontal or vertical which device comprises an elongated member provided with a cursor which is free to slide relatively to a scale on said member, said member being further provided with a gravity-operated angular indicator which can be set at zero in the horizontal or vertical position of said member.

An embodiment of the invention will now be described with reference to the accompanying drawings of which:

FIGURE 1 is a front view of the device with the angular indicator omitted,

FIGURE 2 is a view of the device of FIGURE 1 turned to the left through 90°, omitting the angular indicator mounting but showing a pair of detachable arms, FIGURE 3 shows the front of the angular indicator, FIGURE 4 shows the rear of the angular indicator, FIGURE 5 shows the interior mechanism of the angular indicator, FIGURE 6 shows purely diagrammatically the use of the device in taking a specific measurement on a human figure, and FIGURE 7 is another diagrammatic view illustrating a series of measurements of the human figure which are taken with the improved device for the construction and fitting of a garment therefor.

Referring firstly to FIGURES 1 and 2, the device comprises an elongated member 1 provided with a linear scale 2. A cursor 3 is free to slide on the member relative to the scale. An adjustment cap 4 (shown detached in FIG. 2) is screwed on to a bush 5 fixed to the cursor and contains a spring 6 pressing an insert 7 against the member 1 thus ensuring that the cursor remains in the position to which it was last moved. It will thus be apparent that the straight-line distance between two points can be measured and recorded.

If the distance between two points is greater than the length of the member 1, use is made of an internally slidable extension piece 8. At its inner (or, in this case, upper) end this is fitted with a spring-loaded measuring slide 9 for cooperation with the scale 2. At its other end, the extension piece 8 is provided with a footing 10 of the same diameter as the member 1 and having a slot 11 therein. Before using the extension piece, the cursor is slid down over the footing 10 until the insert 7 comes to the bottom of the slot 11. In this position, the top of the cursor is in line with the highest number on the scale 2. The device can now be extended as necessary to make the measurement required whose total value is equal to the number read off against the slide 9 plus the full length of the scale 2. If necessary, a still further extension piece (not shown) could be screwed into a socket 12 in the footing 10. At the top of the member 1 is a mounting 13 (FIG. 1) for the angular indicator which will now be described with additional reference to FIGS. 3, 4 and 5.

The angular indicator comprises a casing 14 containing a pendulum 15 driving, via step-up gears 16 and 17, a pointer 18. As will be seen from FIG. 3, the pointer 18 co-operates with two scales 19 and 20, one for measuring angles in each direction. By means of the step-up gearing—which in the present instance has a ratio of eight to one—it is possible to use an enlarged scale and so make it easier to obtain an accurate measurement.

As shown, the angular indicator can be attached to its mounting 13 in any one of four different positions at right angles to each other. For this purpose, the back of the casing 14 (FIG. 4) is provided with four domed depressions 21 and the mounting is formed with two complementary projections 22, the depression being 90 degrees apart and the projections 180 degrees apart. The casing 14 is attached to the mounting 13 by a screw 23 loaded by a spring 24 and threaded into a centre pivot bushing 25 on the rear of the casing. The indicator will thus be held by the spring 24 in any one of the four positions where the projections coincide with a pair of projections. In this way, the indicator can be set at zero in either a horizontal or vertical position of the member 1. It will also be observed from FIG. 1 that the mounting 13 can be rotated about an axis perpendicular to that of the pointer 18 to enable readings to be taken from either side of the member as convenient.

The arrangements for mounting the angular indicator need not be as described. For example, the member 1 could be flat and of sufficient width to allow the angular indicator to be incorporated within its overall dimensions as in a builder's spirit level, this form of the invention having valuable application in engineering, building and other fields where it is required to determine accurately and expeditiously angular measurement, vertical settings and/or horizontal levelling.

In some applications, particularly in the clothing trade, the two points between which measurement is to be made may have a prominence between them so that a direct reading cannot be made of the straight line distance between them when using the member 1. To enable the device to be used in these conditions there are provided, in accordance with a feature of the invention, a pair of laterally, e.g., perpendicularly, extending arms 26 and 27. These arms may be integral with the member 1 and the cursor 3 respectively or they may be fixed thereto by press stud fastenings 28, 29 or by screw and socket connections or equivalent releasable means. At their outer ends remote from the sockets 28 and 29, the arms are fitted with mounts 30 and 31 respectively for suitable pads or the like adapted to contact—in this case—a human figure. Mount 30 is shown detached for the sake of clarity. The mounts 30 and 31 are pivotable about axes 32 and 33 which are exactly equidistant from the longitudinal axis of the member 1 but are urged into a position in line with their respective arms by a spring loading a ball as shown at 34 and 35 respectively in the case of the arm 26.

One use of this form of the device is shown in the purely diagrammatic FIG. 6. In this figure a measurement is being made of the length and inclination of a straight line joining two points on a human figure which are separated by a hip prominence 36. For this purpose, the mounts 30 and 31 are fitted with pads 37 and 38 which are capable of resiliently pivoting about the axes 32 and 33 to fit the figure comfortably. Such measurements facilitate the accurate determination of what are known as "suppressions," i.e., the quantity of material which, in well-fitted apparel, has to be reduced by means of seams, darts or the like to fit the area adjacent to a figure prominence.

FIG. 7 illustrates the manner in which measurements of a human figure are taken with the aid of the improved device to provide a profile picture of the figure. It will be seen that by measuring the distance between and the relative angular disposition of each successive pair of points in the series $a \ldots e$ and $f \ldots j$, only eight such measurements being necessary, a complete picture of the figure with all protuberances and suppressions to be embodied in the garment to be fitted thereto is obtained.

Thus it will be seen that the invention provides a measuring device which enables distance and angular indication to be recorded with extreme accuracy and expediency and without the necessity of having to carry out manual adjustment of the angle measuring device as is common with most protractor type devices. Moreover, the improved instrument is equally useful in measuring and defining spaced points, whether separated by a flat surface or by protuberances and suppressions, and without the need of applying lines or other markings to the figure or surface being measured.

What I claim is:

1. A device for measuring the distance in a straight line between two points and for measuring the angle by which said line deviates from the horizontal or vertical, said device comprising:
    an elongated member provided with a scale thereon;
    a cursor freely slidable on said member and relative to said scale, said cursor being provided with means for locking said cursor to said member;
    a gravity-operated angular indicator;
    means for securing said indicator to said elongated member, said securing means being adapted to secure the indicator to said member with said indicator set at zero when the elongated member is either horizontal or vertical; and
    means for extending said elongated member including an extension piece slidable longitudinally away from an end of said member and a slide secured to said extension piece and adapted to move and register with the scale on said elongated member, said extension piece being provided with means for receiving and fixing said cursor with respect thereto.

2. A device as claimed in claim 1, including means for securing said angular indicator to said elongated member in a plurality of different positions, said positions being 90° apart.

3. A device as claimed in claim 1 in which said angular indicator is incorporated in the body of said elongated member.

4. A device as claimed in claim 1 in which said angular indicator comprises a pendulum member, a pointer and step-up gearing means, said pendulum member being arranged to drive said pointer through said step-up gearing means to permit the use of an enlarged scale.

5. A device as claimed in claim 1 and for measuring the distance in a straight line between two points which may have a prominance between them, for which purpose means are provided respectively on said elongated member and on said cursor to receive detachably a pair of laterally extending arms which are adapted at their ends remote from said member and cursor to contact said points.

References Cited
UNITED STATES PATENTS

| | | | |
|---|---|---|---|
| 142,005 | 8/1873 | Delsarte | 33—215.3 |
| 441,675 | 12/1890 | Lewis | 33—7 |
| 474,861 | 5/1892 | Rush | 33—218 |
| 1,001,814 | 8/1911 | Carr | 33—169 |
| 1,170,466 | 2/1916 | Switzer | 33—215.3 |
| 2,137,583 | 11/1938 | Orvold | 33—7 |
| 2,324,334 | 7/1943 | Sutton | 33—169 |
| 3,258,266 | 6/1966 | Kamish | 33—169 |

SAMUEL S. MATTHEWS, *Primary Examiner.*